Aug. 2, 1960 R. F. CASEY ET AL 2,947,943

TROUBLE DETECTOR

Filed Aug. 1, 1957 2 Sheets-Sheet 1

*INVENTORS*
ROBERT F. CASEY
JOHN GIBBON

Aug. 2, 1960 R. F. CASEY ET AL 2,947,943

TROUBLE DETECTOR

Filed Aug. 1, 1957 2 Sheets-Sheet 2

*INVENTORS*
ROBERT F. CASEY
JOHN GIBBON 2,947,943

TROUBLE DETECTOR

Robert F. Casey, Pompton Plains, and John Gibbon, Morris Plains, N.J., assignors to Monroe Calculating Machine Company, Orange, N.J., a corporation of Delaware Filed Aug. 1, 1957, Ser. No. 675,666
2 Claims. (Cl. 324—158)

This invention relates to apparatus for detecting deterioration in binary circuits preceding failure.

Failures occur in electronic equipment at more or less random times and thus impose a requirement for almost constant vigilance to prevent erroneous results. In electronic computers and similar apparatus, many failures and errors do not produce obvious indications and elaborate means are necessary to guarantee against wrong results. One such means which scans and compares the output of dual circuits is shown in the copending U.S. patent application Ser. No. 439,675, filed June 28, 1954, by W. H. Burkhart.

Well designed electronic equipment will continue to operate satisfactorily even though the functions of individual circuits are below their usual standards. If the performance of the individual circuits are checked against stringent standards, deterioration can be detected before it has caused faulty operations. Such deterioration can then be corrected by repair or replacement to prevent a fault from occurring.

The present invention provides a means for detecting deterioration in the performance of binary circuits in computers and other data processing equipment so that faulty operations can be avoided. Stepping switches connect the outputs of key circuits successively to a means which checks the performance against permissible standards. The checks can be made while the equipment is operating normally or special conditions for checking can be time multiplexed with the normal operation to speed up the checking.

The principal check made is on the time for the outputs to change from one level to another when capacitively loaded. In most cases, a loss of performance capability will increase the time required for the change. The checking apparatus compares the time for transition with a standard interval and produces an indication if the time is too long or too short. The apparatus also produces an indication if the two levels are not within predetermined limits. The stepping switch may be stopped on the point at which an erroneous indication is obtained and an alarm signal produced or an identification of the point may be recorded as a guide for repair at a convenient time.

If the checks are made during normal operation, the stepping switch must remain on each point long enough to provide a high probability that the respective circuit has changed condition at least once. The invention also includes means for periodically interrupting the normal operation of the equipment long enough to cycle each bistable circuit from and back to its existing condition. The movements of the stepping switch may be synchronized with these interruptions so that checks may be conducted rapidly and two transitions will be obtained during each check.

An object of the invention is a means for locating deteriorating electronic circuits in binary equipment before they cause faulty operations.

A further object of the invention is an economical apparatus for locating trouble and reducing the probability of errors in digital equipment.

Other objects and a fuller understanding of the invention may be had by referring to the following description and claims, taken in conjunction with the accompanying drawings in which:

This invention is particularly applicable to flip-flops of the type disclosed in copending application, Serial No. 520,981, now Patent No. 2,916,802, and reference is specifically made thereto for a complete description of this flip-flop.

Figure 1:
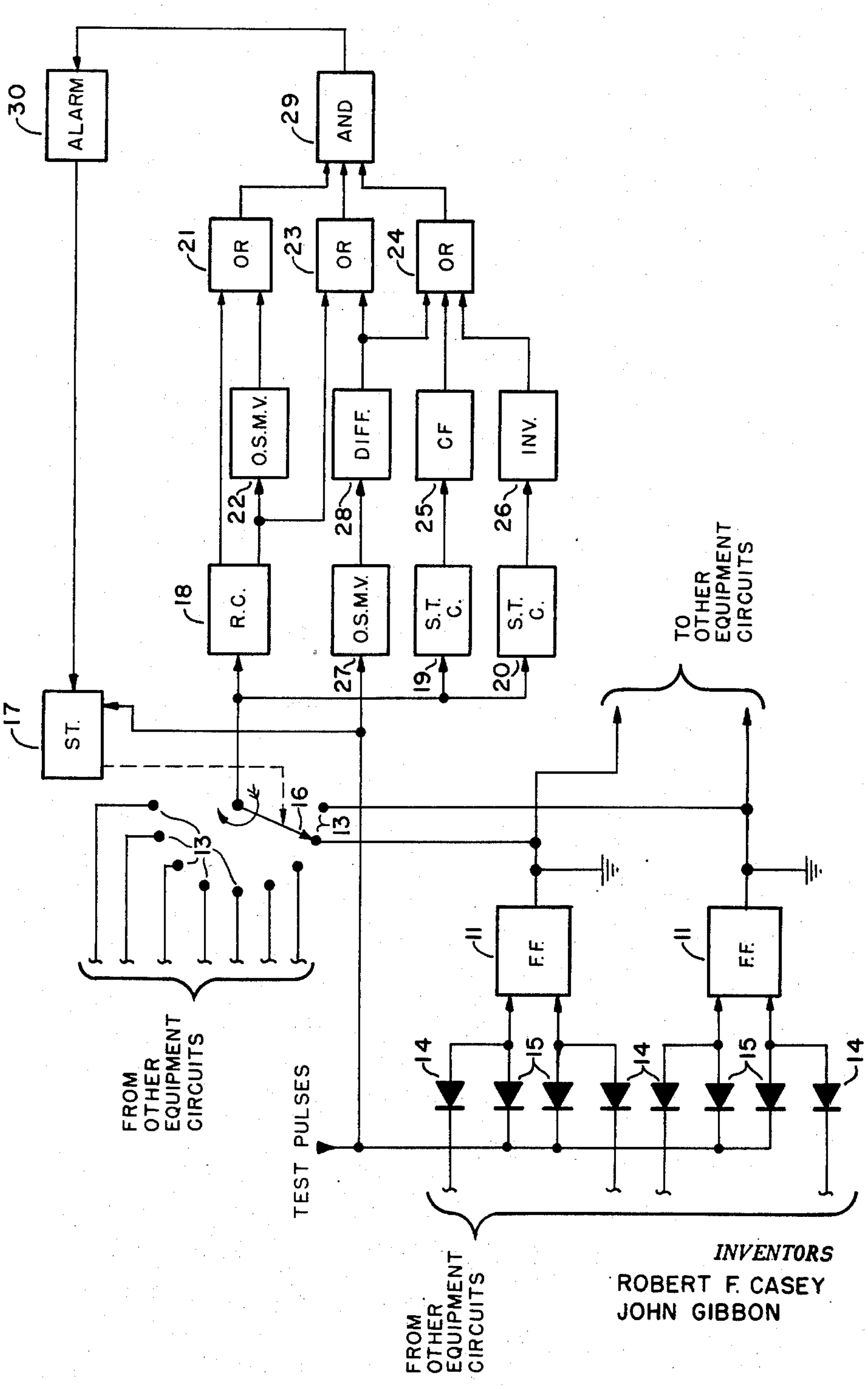
Fig. 1 is a block diagram of an embodiment of the invention.

Referring now to Fig. 1, flip-flops 11 are part of a binary equipment whose operation is to be monitored and are illustrative of the type above referred to. An output of each flip-flop 11 is connected to one of contacts 13 of a stepping switch. The outputs of other circuits of the binary equipment are connected to other contacts 13. These other circuits may also be flip-flops or may be other types of binary circuits having two different levels of output corresponding to their two different conditions and having transition times comparable to those proper for flip-flops 11.

For normal operation as part of the binary equipment, outputs of flip-flops 11 are also applied to other points. Inputs to the set and reset sides of flip-flops 11 are applied from other points in the equipment through crystal diodes 14. Test pulses are applied to both sides of flip-flops 11 through crystal diodes 15. The binary equipment is of a type in which timing pulses are used to synchronize and advance operations. A means (not shown) interrupts the timing pulses to suspend operation at periodic intervals and produces two successive test pulses during each interval. The first test pulse causes flip-flops 11 to change condition and the second test pulse causes them to change back to the original condition so that normal operation can continue after the interruption.

Contacts 13, arm 16, and stepper 17 may comprise a conventional stepping switch. Arm 16 is moved to each of contacts 13 in turn by stepper 17. The test pulses are applied to stepper 17 and each pulse advances it one step to synchronize its positioning with the interruption of normal operation and the cycling of flip-flops 11. If interruptions of normal operation and test pulses are not used, stepper 17 can be free running at a rate that will leave arm 16 on each contact long enough to provide a high probability that the normal operation has caused the associated flip-flop 11 to change condition.

Ramp converter 18 and Schmidt trigger circuits 19 and 20 are connected to arm 16. One output of ramp converter 18 goes to OR gate 21 and another output goes to one shot multivibrator 22 and to OR gate 23. The output of one shot multivibrator 22 goes to OR gate 21. Schmidt trigger circuits 19 and 20 provide outputs to OR gate 24 through cathode follower 25 and inverter 26, respectively. One shot multivibrator 27 is driven by the test pulses and has its output applied through differentiator 28 to OR gates 23 and 24. The outputs of OR gates 21, 23 and 24 are applied to AND gate 29. The output of AND gate 29 drives alarm 30 which provides an output to stepper 17.

Figures 2, 3:
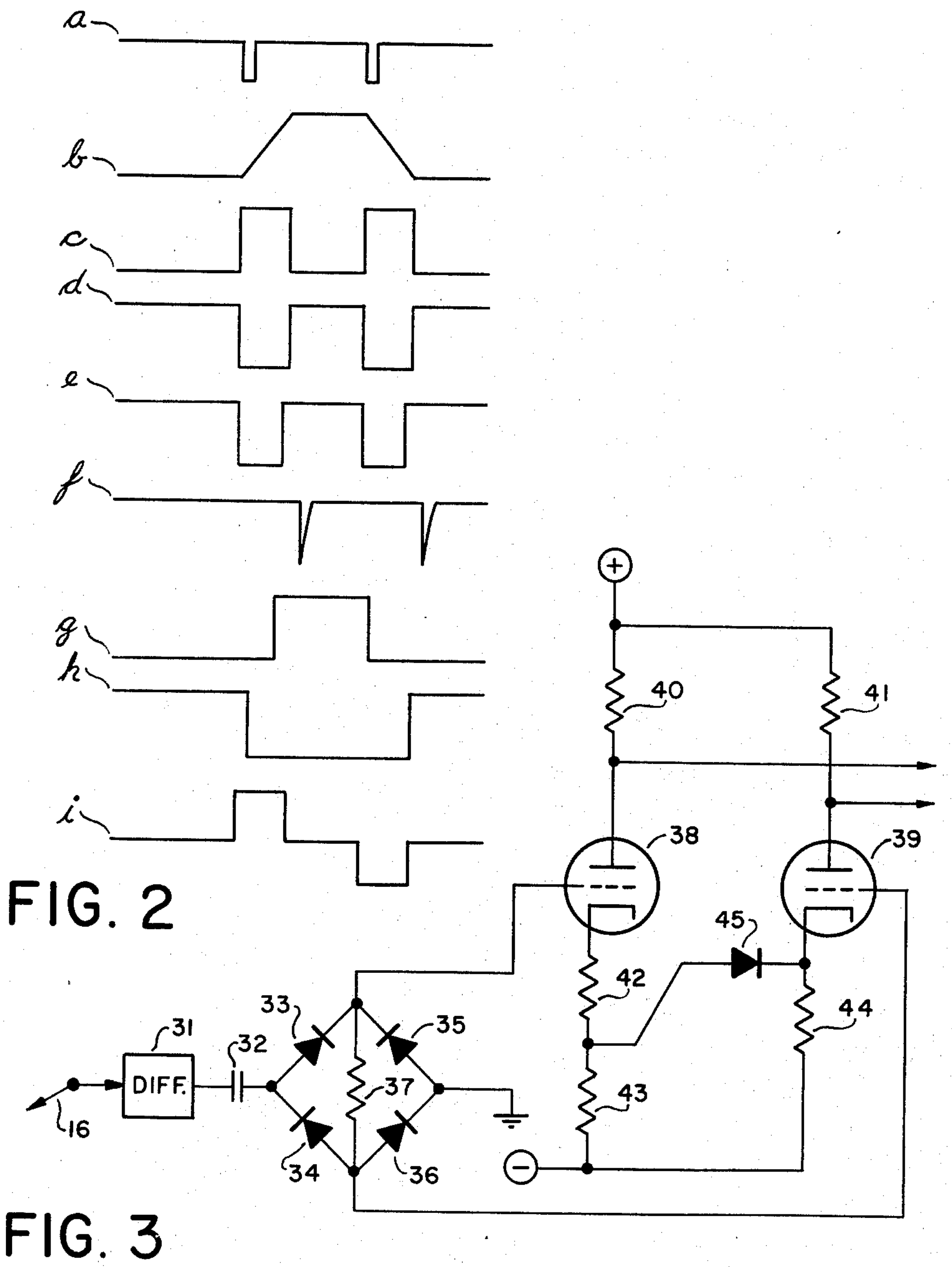
Fig. 2 shows representative signal waveforms occurring at various points in the apparatus of Fig. 1.
Fig. 3 is a partial block and partial schematic diagram of a ramp converter for the apparatus of Fig. 1.

Referring now also to Fig. 2, a pair of test pulses as shown at (*a*) are applied periodically to the inputs of flip-flops 11 through crystal diodes 15. As the test pulses are applied to both sides of flip-flops 11, each causes them to change state. As a flip-flop 11 changes state, its output moves from one level to the other at a specific rate. If the output was initially low, the waveform will be substantially as shown at (*b*).

When an input like that shown at (*b*) is applied to ramp converter 18, it produces two outputs substantially as shown at (*c*) and (*d*). Each time the input changes from one level to another, a positive pulse is generated in one output and a negative pulse in the other. The duration of the pulses is the same as the transition time between levels. One form of ramp converter 18 is shown in Fig. 3 and will be described hereinafter.

The positive pulses from ramp converter 18 are applied to OR gate 21 and the negative pulses to one shot multivibrator 22 and to OR gate 23. One shot multivibrator 22 triggers on the leading edge of each negative pulse and produces a negative pulse of fixed duration as shown at (*e*) to drive OR gate 21. OR gate 21 produces a positive output except when both its inputs are negative. This will occur only if the pulse from ramp converter 18 is shorter than the fixed duration pulse. OR gate 21 will then produce a negative output which indicates that the output of a flip-flop 11 applied through arm 16 has changed from one level to another too rapidly.

The timing pulses also trigger one shot multivibrator 27 to produce a positive pulse of fixed duration. Differentiator 28 operates on the trailing edge of the fixed duration pulse to produce a negative output spike as shown at (*f*), which is applied to OR gates 23 and 24. Like OR gate 21, OR gate 23 produces a positive output except when both its inputs are negative. This will happen only if the spike is produced while the output from ramp converter 18 is still negative. OR gate 23 then produces a negative output which indicates that the output applied through arm 16 has changed from one level to another too slowly.

Schmidt trigger circuit 19 produces a positive output as shown at (*g*) only when the voltage on arm 16 is above a predetermined positive level. Schmidt trigger circuit 20 produces a positive output only when the voltage on arm 16 is more positive than a predetermined negative level. The outputs of Schmidt trigger circuits 19 and 20 are applied to OR gate 24 through cathode follower 25 and inverter 26, respectively. Inverter 26 reverses the polarity of the output of Schmidt trigger circuit 20, as shown at (*h*). As previously mentioned, OR gate 24 receives the negative spikes from differentiator 28 as a third input.

One of the two inputs to OR gate 24 from cathode follower 25 and inverter 26 is thus positive during intervals when the voltage on arm 16 is within an allowable tolerance of either a positive or negative level. Both of these inputs will be negative when the voltage on arm 16 is between the two levels. If this latter condition obtains during the occurrence of the negative spike from differentiator 28, OR gate 24 will produce a negative output to indicate a deterioration in either the positive or negative level of the flip-flop 11 being tested.

The outputs of OR gates 21, 23 and 24 are applied to AND gate 29. AND gate 29 produces a positive output to maintain alarm circuit 30 in an off condition as long as all its inputs are positive. If one or more inputs to AND gate 29 go negative, its output to alarm circuit 30 goes negative and causes alarm circuit 30 to energize a warning lamp or buzzer and prevent stepper 17 from advancing. The position of arm 16 then indicates which of flip-flops 11 or other circuits is responsible for the indication. An indication can also be produced by a failure of circuits in the checking apparatus preceding and including AND gate 29.

Alarm circuit 30 may consist of a warning lamp or buzzer and a lock-on relay which is energized by the negative signal from AND gate 29. One pole of the relay may control the warning lamp or buzzer and another pole may control the stopping of stepper 17. One shot multivibrators 22 and 27, Schmidt trigger circuits 19 and 20, differentiator 28, OR gates 21, 23 and 24, and AND gate 29 may be of standard types well known to those skilled in the digital computer art.

It will be recognized that various other combinations and arrangements of circuits could be used to perform the necessary functions and that the apparatus could be used in various other ways. If normal operation is not interrupted to cycle flip-flops 11, diodes 15 and the test pulses could be eliminated and the timing pulses employed in normal operation could be applied to one shot multivibrator 27 in place of the test pulses. Stepper 17 would advance arm 16 independently at a slow rate to provide a high probability that each circuit would cycle at least once while it was being checked.

Instead of stopping stepper 17 and energizing a warning lamp or buzzer, alarm circuit 30 could energize a recorder to record a code corresponding to the position of arm 16. Another set of contacts 13 and arm 16 driven by stepper 17 could be used to drive a code generator and the recorder could be a spare storage channel built into the computer or other processing equipment.

Referring now to Fig. 3, differentiator 31 is driven by the signal on arm 16. When this signal is as shown at (*b*) in Fig. 2, the output of differentiator 31 will be substantially as shown at (*i*). A positive pulse is produced when the signal changes in a positive direction and a negative pulse when the change is in a negative direction. It is the purpose of the remaining circuits of ramp conveter 18 to make both positive and negative pulses positive in one output and negative in another as shown at (*c*) and (*d*).

Condenser 32 couples the output of differentiator 31 to the anode of crystal diode 33 and the cathode of crystal diode 34. Crystal diode 35 has its cathode connected to the cathode of crystal diode 33 and its anode to ground. Crystal diode 36 has its anode connected to the anode of crystal diode 34 and its cathode to ground. Resistor 37 is connected between the junctions of crystal diodes 33 and 35 and of crystal diodes 34 and 36 which are respectively connected to the grids of tubes 38 and 39.

The plates of tubes 38 and 39 are connected to a positive potential source through resistors 40 and 41, respectively, and an output is taken from each plate. The cathodes of tubes 38 and 39 are connected to a negative potential source through the series combinations of resistors 42 and 43 and through resistor 44, respectively. Crystal diode 45 has its cathode connected to the cathode of tube 39 and its anode to the junction of resistors 42 and 43.

Crystal diode 33 passes the positive pulses from differentiator 31 to the grid of tube 38 and blocks the negative pulses. Crystal diode 34 passes the negative pulses to the grid of tube 39 and blocks the positive pulses. Crystal diodes 35 and 36 offer high impedances to the positive and negative pulses, respectively, and low impedances to the negative and positive pulses, respectively. Resistor 37 provides a path for the charging and discharging of condenser 32 to maintain the average voltage near ground potential.

A positive pulse on the grid of tube 38 increases its conduction and produces a negative pulse output from its plate. The increased current through tube 38 also raises the voltage on its cathode and on the junction of resistors 42 and 43. Crystal diode 45 conducts and pulls the cathode of tube 39 positive with the junction of resistors 42 and 43. This decreases the current through tube 39 and produces a positive pulse output at its plate.

A negative pulse applied to the grid of tube 39 also decreases its conduction and produces a positive pulse output at its plate. The decrease of current through tube 39 lowers the voltage on its cathode. Crystal diode 45 conducts and also lowers the voltage on the junction of resistors 42 and 43 and on the cathode of tube 38.

This causes the current through tube 38 to increase and results in a negative pulse at its plate.

Resistor 42 is relatively small while resistors 43 and 44 are substantially the same size. As the grids of tubes 38 or 39 are normally at the same potential, the input signal to either must exceed a given magnitude before crystal diode 45 conducts. Before crystal diode 45 conducts, the effective cathode impedances of tubes 38 and 39 are high and the one which is driven therefore has a low gain factor. When the input signal exceeds the given magnitude and crystal diode 45 conducts, the effective cathode impedances become low due to the inter cathode coupling, and the gain factors become large.

Tubes 38 and 39 and their associated components thus perform two functions. One is to effectively slice the input signal components that are below a given magnitude from the output. The other is to cause both positive and negative pulses from differentiator 31 to produce negative pulses in the output of tube 38 and positive pulses in the output of tube 39.

Although the invention has been described with a certain degree of particularity, it is understood that the present disclosure has been made only by way of example and that numerous changes in the details of construction and the combination and arrangements of parts may be resorted to without departing from the spirit and scope of the invention as hereinafter claimed.

What is claimed is:

1. In apparatus for detecting deterioration in a binary circuit having two levels of output signals corresponding to the two states of said circuit, respectively, the combination comprising a signal source connected for changing the state of said binary circuit, means connected to an output of said binary circuit and to an output of said source of state changing signals for determining if the time required for the output signal from said binary circuit to change from one level to the other lies within preassigned limits, means for determining if the level of said binary circuit output signal corresponds to one of said levels, indicating means connected to receive signals from both said determining means and being rendered operative by negative response from one of said determinations, wherein said first named determining means comprises means responsive to substantially linearly varying input signals for generating an output signal of fixed amplitude and of duration corresponding to the duration of an input signal, said last named responsive means being connected to receive as input signals the output signals from said binary circuit, and wherein said first named determining means further comprises signal generating means for generating a signal having a duration corresponding to the minimum allowable duration of the shift of said binary circuit between said levels, and a second generating means for generating a signal having a duration in excess of a maximum allowable transition time for the aforementioned binary output signals, gating means connected to receive signals from said linearly varying signal responsive means and signals from said first named signal generating means, said gating means being responsive to the presence of a signal from said first signal generating means and to the absence of a signal from said linearly varying signal responsive means for generating a first gating signal, sense pulse producing means connected to receive signals from said second signal generating means, said sense pulse means being responsive to the termination of received signals, and second gating means connected to receive signals from said linearly varying signal responsive means and from said sense pulse producing means for generating an output signal in said indicating means upon the coincidence of signals from said last two mentioned means.

2. Apparatus as set forth in claim 1 wherein said second named determining means comprises first and second signal generating circuits each connected to receive output signals from said binary circuit, the first of said last named signal generating circuits being responsive to input signals of a level corresponding to the upper one of said aforementioned levels and the second of said last named signal generating means being responsive to an input signal of a level corresponding to the lower one of said aforementioned binary circuit signal levels, and third gating means connected to receive input signals from said last named first and second signal generating means and from said sense pulse producing means, said third gating means being responsive to an absence of signals from either of said last named signal generating means upon the occurrence of a pulse form said sense pulse producing means.

References Cited in the file of this patent

UNITED STATES PATENTS

| | | |
|---|---|---|
| 1,561,225 | Fry | Nov. 10, 1925 |
| 2,756,409 | Lubkin | July 24, 1956 |

UNITED STATES PATENT OFFICE

CERTIFICATION OF CORRECTION

Patent No. 2,947,943 August 2, 1960

Robert F. Casey et al.

It is hereby certified that error appears in the above numbered patent requiring correction and that the said Letters Patent should read as corrected below.

In the drawings, Fig. 1, the connections of the outputs of flip-flops 11 to ground should be removed; in the printed specification, column 2, lines 15 and 16, for "Serial No. 520,981 now Patent No. 2,916,802" read -- Serial No. 570,981, now Patent No. 2,921,192 --.

Signed and sealed this 25th day of April 1961.

(SEAL)
Attest:

ERNEST W. SWIDER
Attesting Officer

DAVID L. LADD
Commissioner of Patents